(12) United States Patent
Seidman et al.

(10) Patent No.: US 10,251,049 B2
(45) Date of Patent: *Apr. 2, 2019

(54) METHOD AND APPARATUS FOR IDENTIFYING A MOBILE USER IN A SITE

(71) Applicant: KIANA ANALYTICS INC., Sunnyvale, CA (US)

(72) Inventors: Glenn R. Seidman, Woodside, CA (US); Nader Fathi, Sunnyvale, CA (US); Klaus ten Hagen, Gorlitz (DE); Sebastian Andreatta, Palo Alto, CA (US)

(73) Assignee: KIANA ANALYTICS INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/987,746

(22) Filed: May 23, 2018

(65) Prior Publication Data

US 2018/0270645 A1 Sep. 20, 2018

Related U.S. Application Data

(63) Continuation of application No. 15/658,309, filed on Jul. 24, 2017, now Pat. No. 9,998,907.

(60) Provisional application No. 62/376,064, filed on Aug. 17, 2016, provisional application No. 62/366,276, filed on Jul. 25, 2016.

(51) Int. Cl.
*H04W 8/00* (2009.01)
*H04W 8/22* (2009.01)
*H04W 4/029* (2018.01)
*G06K 9/00* (2006.01)
*G06K 9/20* (2006.01)
*G06K 9/78* (2006.01)
*H04W 24/08* (2009.01)

(52) U.S. Cl.
CPC ........ *H04W 8/005* (2013.01); *G06K 9/00335* (2013.01); *G06K 9/00758* (2013.01); *G06K 9/00771* (2013.01); *G06K 9/2054* (2013.01); *G06K 9/78* (2013.01); *H04W 4/029* (2018.02); *H04W 8/22* (2013.01); *G06K 2009/00738* (2013.01); *H04W 24/08* (2013.01)

(58) Field of Classification Search
CPC ....... H04W 4/029; H04W 8/005; H04W 8/22; H04W 24/08; G06K 9/00335; G06K 9/00758; G06K 9/00771; G06K 9/2054; G06K 9/78; G06K 2009/00738
See application file for complete search history.

(56) References Cited

U.S. PATENT DOCUMENTS

2015/0304283 A1  10/2015  Hallett et al.
2017/0339099 A1  11/2017  Levy-Abegnoli et al.

*Primary Examiner* — Wayne H Cai
(74) *Attorney, Agent, or Firm* — Lewis Roca Rothgerber Christie LLP

(57) ABSTRACT

A system and method for identifying mobile users in a site includes: receiving, in real time, data packets from wireless access points; identifying unique device identifications from the received data packets, and time stamping each identified unique device identification; determining repetitive or false unique device identifications in the identified unique device identification; and eliminating the repetitive or false unique device identifications in the identified unique device identification to obtain a plurality of accurate unique device identifications.

20 Claims, 7 Drawing Sheets

500

Locally administered mac

METHOD AND APPARATUS FOR IDENTIFYING A MOBILE USER IN A SITE

CROSS-REFERENCE TO RELATED APPLICATIONS

This is a continuation application of U.S. patent application Ser. No. 15/658,309, filed Jul. 24, 2017, which claims priority to and benefit of U.S. Provisional Patent Application Ser. No. 62/376,064, filed on Aug. 17, 2016 and entitled "Method And Apparatus For Integrated Tracking Of Visitors;" and Provisional Patent Application Ser. No. 62/366,276, filed on Jul. 25, 2016 and entitled "Method And Apparatus For Reversing MAC Privacy Settings," the entire contents of which are hereby expressly incorporated herein by reference.

FIELD OF THE INVENTION

The present invention relates generally to electronically monitoring visitor traffic for the purposes of security, as well as measurement, and more specifically to a system and method for undoing identification of wireless mobile devices, for example, media access control (MAC), privacy mechanism.

BACKGROUND

Mobile/wireless devices are now commonplace among consumers and are used regularly to search for information, content and data on products and services across all industries. Retail and other enterprise environments can now use information gathered from mobile devices on their premises to engage visitors in more meaningful ways. Providing an entry point for mobile marketing, mobile devices are important to broadcast offers, information and location services to users who are on site or close thereto. However this information has low value if there is no additional information provided about what users are doing on the premise, where they are visiting, what their demographic information is, and pinpointing their needs and interest in a more targeted fashion. Providing an immersive environment where visitors, behavior can be predicted and influenced is a key objective to future retail, restaurant and other service industries.

Users and visitors to retail and other public environments (public zones) such as transit hubs, hospitals, schools and city streets may be immersed in zones where different types of radio based connectivity and communications points are available. WiFi, Bluetooth, Bluetooth Low Energy, 3G, 4G, LTE and others can provide venues for different means of communication with data and objects around the user. These technologies can provide different forms of information and access to internet data based on smartphone apps, browser based web applications, as well as analysis from visitor metrics collected from visitors to public zones to identify interests and needs. The providers of these technologies may be carriers, merchants, other enterprises, governmental agencies, security agencies and the like. These providers can use these technologies to allow local users (both actively or passively) to connect and receive specific information and services in the form of commercial offers, location based services and bandwidth/communications access. The technology providers can collect the user metrics (based on permissions, for example, from their profiles) including social WiFi login details, location and individual demographics for various commercial and customer assistance opportunities.

Wireless client devices connect to wireless access points or base-stations for communication. To ensure unique one-to-one communication, each device has a given unique identification address. For example, with the IEEE 802.11 wireless communication protocol, each device is given a unique media access control (MAC) address comprised of 6 hexadecimal octets. An example of a MAC address for a device is "00:FF:11:22:33:44:55." A MAC address is a unique identifier typically assigned to network interfaces for communications on the physical network segment. MAC addresses are used as a network address for most IEEE 802 network technologies, including Ethernet and WiFi.

Each device employs a unique MAC address with this format when searching for a wireless base-station. Methods were devised to use this unique MAC address announcement for the purpose of identifying visitors for security purposes or when counting customers in a retail location. To prevent such observation, a mechanism of generating numerous extraneous randomized MAC addresses has been introduced by companies like Apple™ in IOS8™ as a method to provide better privacy to the devices.

This way, the MAC address changes when the mobile device is not connected to a network or access point and therefore the MAC address cannot be used to identify or track the device. Such randomization introduces unwanted phantom devices to obfuscate the real identified devices of value to the data gathering and analysis system. If such (raw or unfiltered) information is used, it will cause inaccuracy in new versus repeat visitor calculations and related analytics. For example, the randomized MAC address detected causes a measurement system to detect the device as a new device versus as a previously known (same) device. That is, if used as is, each random MAC address adds a false observation causing major inaccuracy in the observation/traffic data.

The MAC randomization has challenged tracking of individuals for security purposes as well as the measurement of unique MACs for traffic analysis since this prolific generation of random MAC addresses introduces unwanted phantom devices to obfuscate the real devices. If used "as is", the information will cause difficulty in identifying real devices and cause inaccuracy in the typical new versus repeat visitor calculation. The random MAC addresses produced cause the measuring device to detect devices as new devices verses previously known devices, as this is the intent of the "privacy generating" randomization algorithm.

Traffic measurement of visitors to public environments (zones) is adversely affected by the MAC randomization because of the following:
 a) Dwell-time anomalies, e.g., first and last seen
  i) More observations with a dwell-time of <1 minute.
  ii) More observations with a dwell-time <3 minute.
  iii) More traffic w/a dwell-time between 3 and 20 minutes.
  iv) Less traffic w/a dwell-time >20 minutes.
 b) New vs. Repeat inaccuracies
  i) Dramatic increase of New so call "false" visitors.
  ii) No or small decline in Repeat inaccuracies.

In light of the above challenges caused by MAC privacy randomization, there is a need for a method and system that can undo or reverse MAC randomization for the purpose of tracking individuals and measuring visitor traffic.

SUMMARY

In some embodiments, the disclosed invention is a method or a non-transitory computer storage medium including a plurality of instructions for performing a process for identifying mobile users in a site, the site including a plurality of wireless access points. The method or the process includes: receiving, in real time, data packets from the plurality of wireless access points; identifying unique device identifications from the received data packets, and time stamping each identified unique device identification; determining repetitive or false unique device identifications in the identified unique device identification; eliminating the repetitive or false unique device identifications in the identified unique device identification to obtain a plurality of accurate unique device identifications; using the plurality of accurate unique device identifications to identify corresponding mobile devices associated with each accurate unique device identifications.

In some embodiments, the disclosed invention is a system for identifying mobile users in a site. The system includes: a plurality of mobile devices in the site; a wireless access point for receiving data packets from the plurality of mobile devices attempting to access a computer network, the data packets including mobile device identifications; and a server in communication with the computer network for receiving, in real time, said data packets from the access point, identifying unique device identifications from the received data packets, and time stamping each identified unique device identification, determining repetitive or false unique device identifications in the identified unique device identification, and eliminating the repetitive or false unique device identifications in the identified unique device identification to obtain a plurality of accurate unique device identifications.

The unique device identifications may be MAC addresses, IMEI and/or Bluetooth identifiers. In some embodiments, the disclosed invention predicts what the users will do or where the users will go within the site, once the accurate unique device identifications are obtained.

In some embodiments, the disclosed invention my include a dwell-time filter for identifying unique device identifications and determining repetitive or false unique device identifications, based on a threshold value. In some embodiments, the dwell-time filter includes one or more of a recency-time filter, an odd-behavior filter, an Organizationally Unique Identifier (OUI) filter, a locally administered device identification and a predetermined device identification pattern. In some embodiments, the dwell-time filter dynamically changes based on system parameters or a number of false-positives in a given time period or per a given number of observations.

BRIEF DESCRIPTION OF THE DRAWINGS

These and other features, aspects, and advantages of the present invention will become better understood with regard to the following description, appended claims, and accompanying drawings.

DETAILED DESCRIPTION

Figure 1:
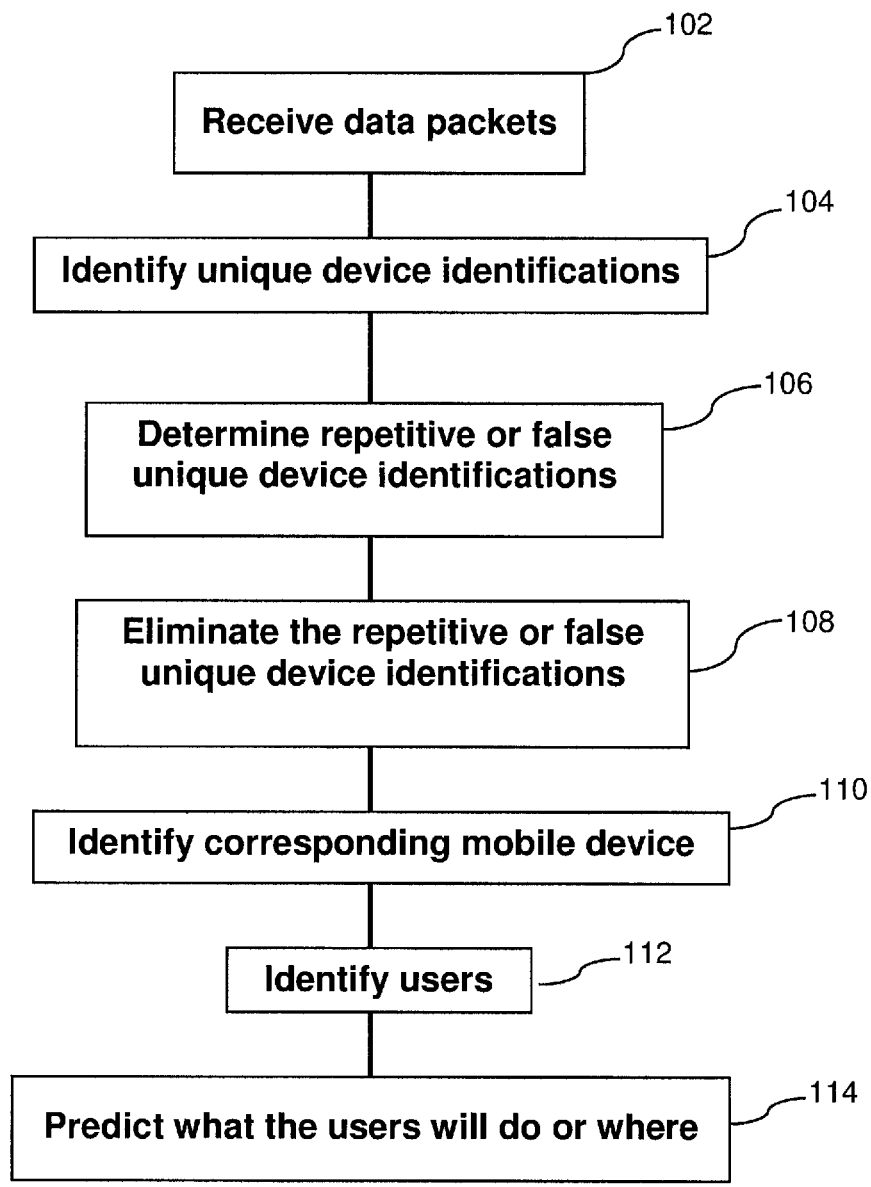
FIG. 1 shows a process flow for accurately identifying mobile users in a site, according to some embodiments of the disclosed invention.

In some embodiments, the disclosed invention is a system and method for undoing identification of mobile devices privacy mechanism, for example, a media access control (MAC) privacy mechanism, to obtain a plurality of accurate unique device identifications. Although, the depicted examples in the present disclosure refer to MAC addresses, one skilled in the art would recognize that the disclosed invention is also applicable to other methods of unique identification of mobile devices, such as International Mobile Equipment Identity (IMEI) and Bluetooth Identifiers.

In some embodiments, the disclosed invention is a system and/or process associated with one or more wireless access point devices that includes a device identification (e.g., MAC address) listener that receives a device identifications (e.g., MAC addresses) from data packets received by any one of the associated wireless access point devices; a filter manager for eliminating device identifiers (e.g., MAC addresses) determined to be extraneous (repetitive and/or false) based on one or more filtering techniques; and one or more databases for storing device identifiers (e.g., MAC addresses) determined to be persistent and unique for storing observation records with device identifiers (e.g., MAC addresses) and timestamp.

An observation record may include a device identifiers (e.g., MAC addresses) with a timestamp for first seen and a timestamp for last seen device identifiers (e.g., MAC addresses). The observation records may further include the number of detected observations.

In some embodiments, the filter manager may further include one or more filter policies to process the device identifiers (e.g., MAC addresses) and the timestamps to determine whether a device identifier (e.g., MAC addresses) is false or real. The database may be queried to make further decisions about whether or not a MAC address is false or real.

In some embodiments, a filter policy removes sporadic rarely seen device identifiers (e.g., MAC addresses) based on their dwell-times, removes device identifiers (e.g., MAC addresses) that conform to a specific pattern, and/or removes locally administered device identifiers (e.g., MAC addresses) s.

In some embodiments, the device and method of the disclosed invention filter out the unwanted observations from a measurement system that is seeking to identify mobile devices in a location and measures the traffic and its nature for the location. The disclosed invention identifies real (same) devices and observations from the masking random devices and observations, and filters the masking random devices and observations from the results.

In some embodiments, the device and method of the disclosed invention electronically detects and measures visitor traffic for a site, applies correction filtering to the measurement data for higher accuracy, and analyzes the filtered data to apply analytics to analyze behavior of the users/visitors and to predict what users will do or where they will go next. The technology may be used in retail, public and government places, live entertainment venues, service organizations, security and law enforcement applications, and the like. The disclosed invention also improves e-commerce technology, security related technology, entertainment related technology, and mobile device identification technology by providing a more accurate headcount and identification of people attending, gathering and/or entering an area or venue.

FIG. 1 shows a process flow for accurately identifying mobile users in a site, according to some embodiments of the disclosed invention. As shown in block 102, data packets from one or more wireless access point are received in real time. In some embodiments, the data packets are received from the mobile devices that are accessing one or more of the wireless access points, for example, for Internet browsing or obtaining online information. In some embodiments, a server receives the data packets from the access points and performs the filtering and predictive analytics. In some embodiments, one or more of the access points receives the data packets from the other access points and perform the filtering and predictive analytics. The process may be stored in a computer storage medium and executed by a server or tone or more of the access points. In block 104, unique device identifications, for example MAC addresses, of the mobile device (accessing the access points) are identified from the received data packets and optionally saved in a computer storage, for example, based on the predetermined data structure of the data packets. These unique device identifications (e.g., MAC addresses) are then time stamped. For example, a first-seen and a last-seen unique device identification for each unique device identifications is time stamped.

In block 106, the disclosed invention determines repetitive or false unique device identifications among the identified unique device identifications. In some embodiments, the disclosed invention uses various filtering techniques (as described below) and/or the time stamps to determine these repetitive or false unique device identifications. The process according to the disclosed invention then eliminates the repetitive or false unique device identifications in the identified unique device identification to obtain a plurality of accurate (true) unique device identifications, in block 108. For example, the disclosed invention may simply delete the identified repetitive or false unique device identifications from the stored identified unique device identifications and as a result, the remanding unique device identifications in the computer storage would be the accurate (true) device identification.

In block 110, the disclosed invention identifies mobile devices corresponding to the accurate unique device identification, for example, based on the information that the mobile devices with their unique device identifications exchange with one or more of the access points. In block 112, the disclosed invention identifies the users of the identified mobile devices, for example, based on the information that the mobile devices exchange with one or more of the access points and/or based a database of the users or potential users. The database of users and potential users may also include their history of activities, the locations that they had been, their habits, purchase history and profile of preferences and demographics.

In block 114, the disclosed invention predicts what the identified users will most likely do or where they most likely go to next, based on their patterns of behavior within the site and historical data stored in a user database. For example, a predicted future path of the individuals, the next website that they may access on their mobile devices (browsing behavior), the next product that they may look at or purchase, the next physical location that they may access, for example, opening a door or a safe, existing from a location, or what type/size of objects they carry, while on site, may be predicted by the invention, based on different metrics and prior visits to the site or other sites. Each of these factors may be weighted differently, depending on the user and the site type, and their activities. This predicted information may then be used by merchants, advertisers, government agencies, law enforcement or retail stores to have a much more accurate information about the users and their behavior and use such accurate information for e-commerce, promotions, headcount, or security purposes. For example, more accurate information about what users are doing on the premise (site), where (physical and online locations) they are visiting, what their demographic information is, and therefore pinpointing their needs, objectives and/or interests in a more accurate and targeted fashion.

Figure 2:
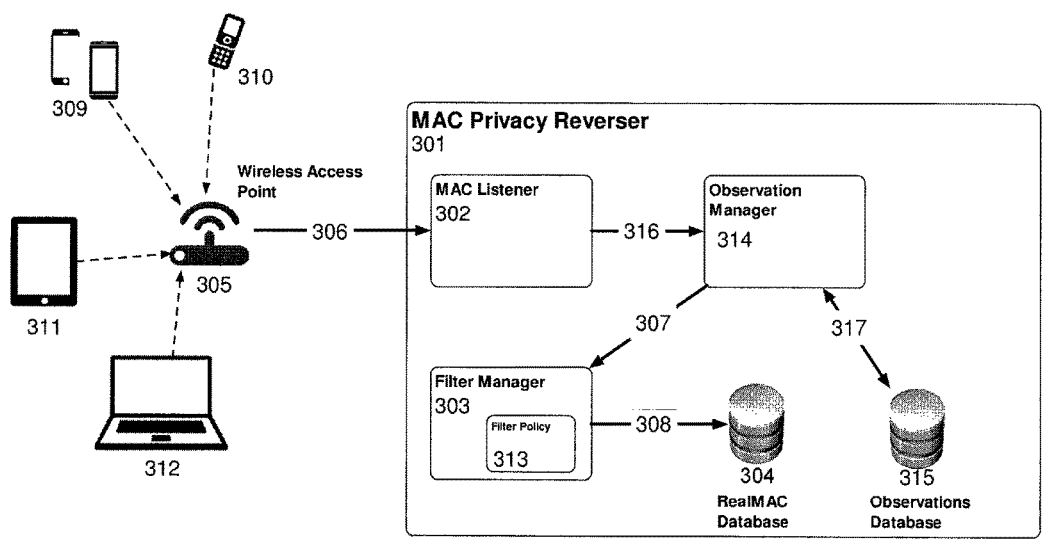
FIG. 2 illustrates a simplified block diagram of an environment including an unique device identification privacy reverser system, according to some embodiments of the disclosed invention.

FIG. 2 illustrates a simplified block diagram of an environment including an unique device identification, such as a MAC privacy reverser system, according to some embodiments of the disclosed invention. As shown, environment 300, for example a server, includes a device id (MAC) privacy reverser 301 that listens to a wireless access point 305 that received data packets from nearby mobile devices 309, 310, 311 and 312. Once the wireless access point 305 receives mobile device data packets, the device id (MAC) privacy reverser 301 receives the packets to process their device ids (e.g., MAC addresses). In such embodiments, the device id (MAC) privacy reverser 301 may include a device id (MAC) listener 302 that receives the packets from the wireless access point 305. The device id (MAC) listener 302 may poll for log updates containing device ids (MAC addresses) from the wireless access point 305, or the wireless access point 305 may be configured to push log updates to the device id (MAC) listener 302. This subsystem distills the log information for the device ids (MAC addresses) and communicates them 316 to an observation manager 314.

A filter manager 303, determines whether a device ids (MAC addresses) is real or false by performing one or more filter policies 313. These filter policies 313 are applied to the incoming device ids (MAC addresses) to determine whether or not the device ids (MAC addresses) are real or not. If the device ids (MAC addresses) are real, the real device ids (MAC addresses) and the current timestamp are both stored and indexed 308 in a database 304.

The observation manager 314 receives MAC address and timestamp information from the device id (MAC) listener 302 and keeps the observations database 315 up to date. When a new updated observation record is computed, it is stored (317) in the observations database 315 and submitted (307) to the filter manager 303. In some embodiments, observations associated with false MAC addresses are also recorded with the device ids (MAC addresses). The Observation Manager 314 primarily records 317 observations in the observations database 315. In some embodiments, each observation record stored is a structure comprising a device ids (MAC addresses) and timestamp. These two fields of information may later be employed to filter device ids (MAC addresses) based on the device ids (MAC addresses) content and the time that it was observed.

Some embodiments of the disclosed invention employ observation records that are structured with MAC address, first seen (newly observed) timestamp, and last seen timestamp. Such embodiments provide for implementing filter policies 313 that can filter by first and last seen or dwell time.

Some embodiments of the disclosed invention employ an observation record structure comprising device id (MAC), number of detections, first seen timestamp, and last seen timestamp. Such an embodiment provides for implementing filter policies 313 that can filter by anomalous too few or too many detections collected.

Some embodiments of the disclosed invention implement a filter policy 313 as a coded class, where "class" is the primary construct in an object oriented language and an "interface" is a template for method signatures that a class should conform to. Each developed class conforms to an interface such as "interface FilterPolicy" having one method signature "Boolean filter (Observation an Observation)". The filter manager 303 then stores only MAC addresses in a RealMAC Database 304 when filter( ) answers false. If it answers true, the MAC Address is dropped.

Some embodiments of the disclosed invention include a filter manager 303 that does not drop the MAC addresses which caused filter( ) to answer true, but instead stores the address determined to be false in either a false address database (not shown) or in the observation database 304. These addresses can be queried later to confirm a false address or used for false address analysis.

MAC listener 302 distills a log and submits each MAC address to the filter manager 303 with the associated timestamp. The filter manager 303 is capable of supporting any number of filter policies 313.

In some embodiments, a Unique MAC counter keeps track of the quantity of unique MAC addresses observed in a given period of time specified, where it may further declare that the quantity sought is for newly found MAC addresses, or updated MAC addresses. For example, the Unique MAC Counter may answer 3871 MAC address events in a time period, and only 762 unique MACs in the same time period. If only "new" unique MAC addresses are sought, then the Unique MAC Counter only counts the unique MAC addresses that were not present prior to the specified time period and are, hence, "new". If only "updated" unique MAC addresses are sought, then the MAC Counter only counts the unique MAC addresses that were present prior to the specified time period, and are, hence, "updated". As a result, "new" and "update" are opposite cases of unique MAC addresses observed in the time prior relative to a previous time period.

In some embodiments, the disclosed invention further incorporates one or more wireless access points wherein each access point provides a primary wireless network interface with a distinct frequency for wireless devices to associate with, and a secondary wireless network interface which continuously and simultaneously scans all frequencies to receive packets from all nearby wireless devices to communicate them to the MAC address listener.

In some embodiments, each wireless access point device is capable of communicating its primary wireless network interface frequency to a controller where a complete list of all distinct frequencies being used by all wireless access points is communicated back to each wireless access point. Each wireless access point device's secondary wireless network interface scans only the list of distinct frequencies received by a centralized software subsystem.

The filtering mechanism of the disclosed invention is not limited to MAC addresses and can be applied to any wireless communication mechanism where unique identifiers are used, that is, unique wireless identifiers.

Figure 3:
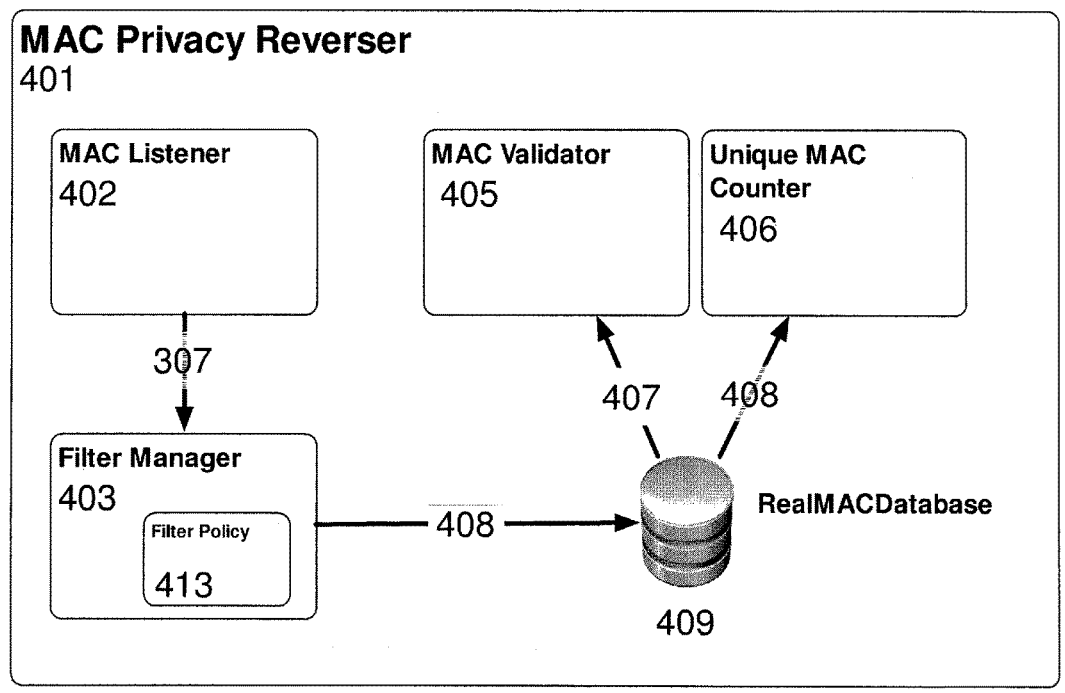
FIG. 3 depicts a simplified block diagram of an unique device identification privacy reverser, according to some embodiments of the disclosed invention.

FIG. 3 depicts a simplified block diagram of an unique device identification, such as a MAC privacy reverser, according to some embodiments of the disclosed invention. As shown, the MAC privacy reverser 401 further comprising a MAC validator 405 and a unique MAC counter 406. The MAC validator 405 receives a MAC address as input and submits a query to determine if the MAC address already exists (407) in the RealMAC Database 404. If it does, the MAC address is real and validated. If the MAC address is not in the database, then the operation returns a false.

The unique MAC counter 406 tracks the number of unique MAC addresses observed over a given period. As the unique MAC counter 406 takes a time period input, the number of unique MAC addresses is answered by employing a query 408 with a date and time range. In some embodiments, a filter policy 413 represents a dwell-time filter. The dwell-time can be set to below a threshold, above a threshold, or between two thresholds. The value for a threshold is typically determined by experiment or system environment.

In some embodiments, a filter policy 413 that represents a recency-time filter. When a mobile device with a MAC address enters a wireless area and gets detected, it can be tracked but eventually it leaves the area and is no longer trackable. A real MAC address will often come back again and the time between the previous entry to the wireless locale and now the new entry time is known as the "recency time." MAC addresses that are false tend to show up often, multiple times in one day, and/or exhibit some other odd behavior pattern that is not typical of human visitation behavior. For example, a number of MAC addresses may appear in random locations at a facility without having been seen by any other WiFi device at an entrance or as they moved through the facility. Typically, a device would show a path of movement as its MAC address is registered by access devices along its path. A recency example includes a case where a Mac address keeps showing up and leaving every 30 minutes. This is likely a false Mac address. An odd behavior example includes a Mac address where its path seemed to appear in the middle of a room without coming through an entrance. Such a Mac address is likely to be false. As such, these strange recency time patterns are a determiner of falsehood with a recency-time filter policy 413 that stores such odd behavior patterns.

In some embodiments, the filter policy 413 may represent an Organizationally Unique Identifier (OUI) filter. The MAC address is compared with the associated registered organization in a predetermined OUI list. In this case, the list or database of MAC addresses is the known universal IEEE registered mac addresses. MAC addresses with patterns that do not match a valid registrant are designated as invalid.

In some embodiments, the filter policy 413 may represent a locally administered MAC address filter. Locally administered means that the MAC address was created locally and is not a real device MAC address. Locally administered MAC addresses are a "telltale" indicator that the MAC address is false, denoted by bit #2 of the first octet of the MAC address as shown circled in FIG. 4.

Figure 4:
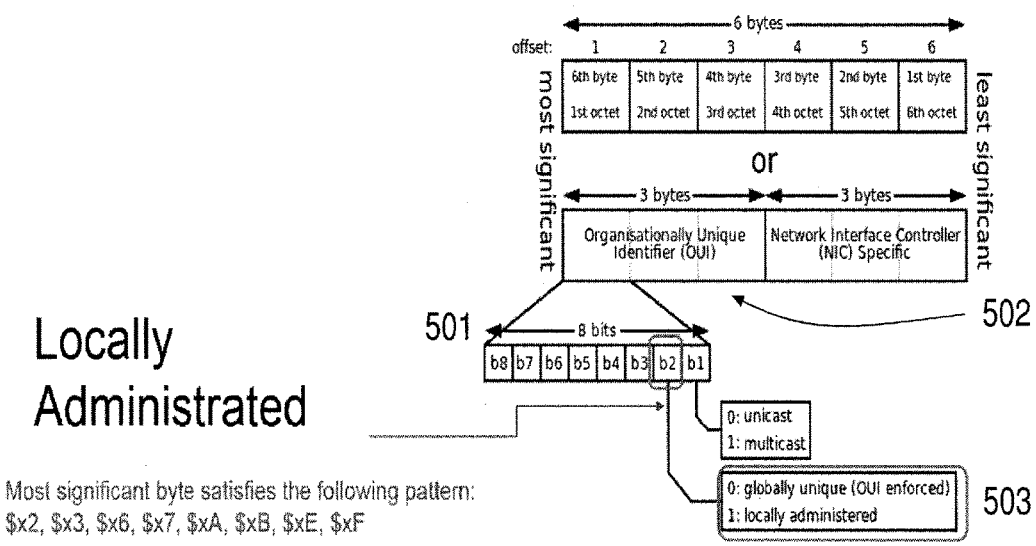
FIG. 4 illustrates the organization of an unique device identification address, according to some embodiments of the disclosed invention.

FIG. 4 illustrates the organization of an unique device identification, such as a MAC address 500, according to some embodiments of the disclosed invention. As depicted, the first 3 bytes 502 of the MAC address contains the OUI. When bit #b2 (503) is set on byte 1 (501), this means that the MAC address was manipulated locally and as such, doesn't need to be globally unique.

In some embodiments, the filter policy may represent a pre-determined device id (e.g., MAC address) pattern determined to be false. An example of such a policy could be any address which matches XX:XX:XX:00:X9:09 where X represents that the bits may be anything. In some embodiments, the filter policy dynamically changes based on system parameters and/or number of false-positives in a given time period and/or per a given number of observations.

In some embodiments, the filter policy may recognize that a particular MAC address keeps changing but represents the same real device such that the filter policy's filter( )method answers false to indicate a real device. This filter policy becomes suspicious of a changed MAC address when the alleged single real device's timestamped tracking path in (x, y, z) coordinates being collected is continuous and likely when it takes on a specific new MAC address at irregular or regular time intervals. However, high confirmation is realized when the MAC address continues to change on a highly regular time interval.

With the changing device id (MAC address) filter policy, the invention augments a filter manager so that it does not keep storing each changed real MAC address. Instead, the filter manager replaces the previous MAC address with the new one. This makes sure that at all times the count of real MAC addresses is accurate and that means that there needs to be only one real MAC address per device. Also, the older replaced MAC addresses are never to be used again such that they are useless, or they may be presented again by the same real device, which would cause confusion. In either case, continuous replacement of the MAC address with the latest MAC address always gives the correct answer for a MAC validator and unique MAC counter.

In some embodiments, the filter manager provides for filter policies to be "ANDed" in a sequence such that they all must answer true in order for the filter manager to conclude that the MAC address is false. In some embodiments, the filter manager provides for filter policies to be "ORed" in a sequence such that if any answer is true, then the filter manager concludes that the MAC address is false. In some embodiments, the filter manager provides for filter policies to be any combination of ANDed and ORed policies in a sequence. Parenthesis may be applied to prioritize AND and OR subsequences to be computed first. When the resulting combination sequence answers true, the filter manager concludes that the MAC address is false.

Figure 5:
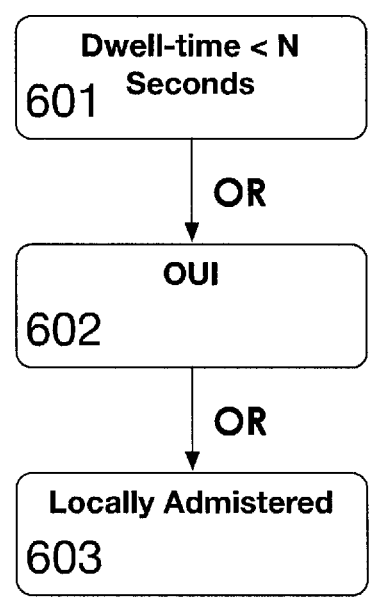
FIG. 5 illustrates an ORed sequence of filter policies for IOSB™, according to some embodiments of the disclosed invention.

FIG. 5 illustrates an ORed sequence 600 of filter policies for IOS8™, according to some embodiments of the disclosed invention. The sequence comprises a dwell-time filter policy 601, an OUI filter policy 602, and a locally administered filter policy 602, each of which have been described previously.

Figure 6:
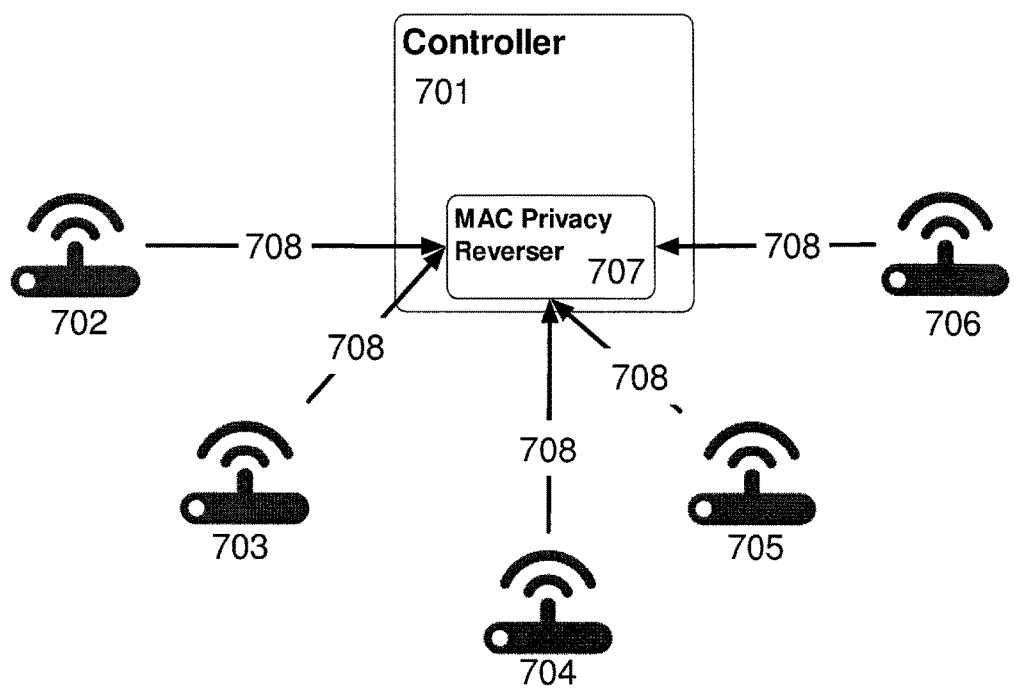
FIG. 6 depicts a simplified block diagram of an unique device identification privacy reverser with wireless access points and a controller, according to some embodiments of the disclosed invention.

FIG. 6 depicts a simplified block diagram of a unique device identification, such as a MAC privacy reverser with wireless access points and a controller, according to some embodiments of the disclosed invention. In these embodiments, the disclosed invention takes into account the fact that a single wireless access point provides insufficient geographical coverage to capture wireless device packets in a large locale. Multiple wireless access point deployment is typical at public places such as malls, transportation hubs, and universities. As shown, such a deployment includes any number of wireless access points (702-706) and a centralized controller 701 that processes the data packet to realize specific information or analytic goals. As illustrated, packets first arrive to the MAC privacy reverser 707 in the controller 701 so that the controller operates on only real MAC addresses.

Each wireless access point (702-706) receives data packets from wireless devices in the locale, wherein the data packet may be:
a) stored and pushed in bulk periodically to the MAC privacy reverser,
b) stored and pulled in bulk periodically from the access point to the MAC privacy reverser, and/or
c) not stored, but immediately pushed to the MAC privacy reverser.

The embodiments of the disclosed invention with many access points is capable of processing data packets in the same simplified manner as having one access point, because all of the data packets arrive to the same centralized location regardless of how many access points there are. As such, duplicate MAC addresses can be discarded.

Figure 7:
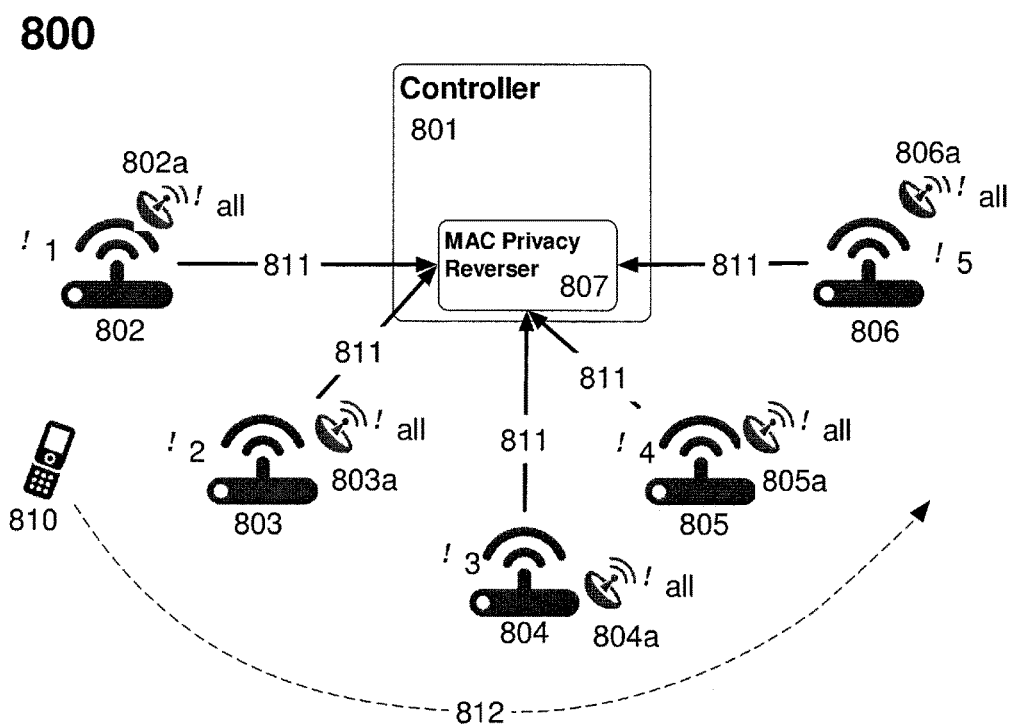
FIG. 7 shows a simplified block diagram of an unique device identification privacy reverser with a controller and wireless access points, according to some embodiments of the disclosed invention.

FIG. 7 shows a simplified block diagram of an unique device identification, such as a MAC privacy reverser with a controller and wireless access points each having a distinct channel frequency and separate sensor wireless network controller on a common frequency, according to some embodiments of the disclosed invention. As illustrated, the MAC privacy reverser also includes a wireless device moving by one or more of the wireless access points. In these embodiments, multiple access points are deployed, each communicating on a distinct channel frequency to realize higher accuracy and capacity amongst other access points. In this case, when a wireless device 810 moves out of range of one access point and into range of another access point, it is not seen by the in range access point because the wireless device is on a different frequency. While eventually the wireless device may connect to a different access point with a different channel frequency, some of its packet generation could be lost, since in general, the reconnection takes time.

The embodiments of the disclosed invention with distinct frequency access points (802-806) solve the distinct access point channel frequency problem by augmenting each wireless access point with an additional sensor network interface (802a-806a). Thus, each access point has a primary wireless network interface operating on a distinct frequency and an additional second sensor wireless network interface (802a-806a). In some embodiments, these sensors are WiFi access points that are configured in a listen only mode to scan for mobile WiFi devices that may be pinging in the vicinity. In the listening mode, these access points can scan on all channels in the WiFi spectrum to identify any device, regardless on which channel the device might be using. In some embodiments, the sensor wireless network interface is the part of a typical WIFI access point that scans all frequencies for the presence of nearby devices with Mac addresses.

The additional sensor network interfaces continuously and simultaneously, along with the primary wireless network interface, scans all frequencies of the access points so that each access point can detect any wireless device even those that are associated with a specific wireless access point's primary frequency. Since all of the multiple wireless access points have this additional sensor network interface, they can all detect all wireless devices as they move through the local ecosystem of access points. The result is an ability to stream all packets to controller 801, where a centralized MAC privacy reverser 807 performs processing.

In some embodiments, each wireless access point communicates its distinct primary wireless network interface frequency to the controller 801. This way, the controller knows all of the distinct frequencies being employed. The controller then communicates back to each wireless access point a complete list of all distinct frequencies being used. In some embodiments, the sensors scan across all frequency channels available in the WiFi spectrum to search for any device that may be pinging regardless of the channel used so that the sensor network interfaces precisely know which frequencies they can efficiently scan, rather than scanning frequencies that are not being used at all. In some embodiments, the sensor wireless network interface knows which frequency it is scanning at a given moment and can associate the frequency with the device in order to find the device again efficiently.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as depicted by the appended claims and drawings.

The invention claimed is:

1. A method for identifying a mobile user in a site, the method comprising:
   receiving, in real time and via a wireless network, a plurality of data packets from a wireless access point;
   determining a plurality of different device identifications for a mobile device used by the mobile user, from the received data packets;
   determining repetitive or false device identifications in the determined plurality of different device identifications;
   eliminating the repetitive or false device identifications in the determined plurality of different device identification to obtain an accurate device identification;
   using the accurate device identification to uniquely identify the mobile device associated with the accurate device identification; and
   predicting what the mobile user will do or where the mobile user will go within the site.

2. The method of claim 1, wherein the plurality of different device identifications are one or more of media access control (MAC) addresses, International Mobile Equipment Identity (IMEI) and Bluetooth Identifiers.

3. The method of claim 1, further comprising time stamping a first-seen and a last-seen device identification from the plurality of different device identifications.

4. The method of claim 1, further comprising storing the repetitive or false unique device identifications; and verifying the accurate device identification against the stored repetitive or false unique device identifications.

5. The method of claim 1, wherein said predicting includes one or more of future paths of the mobile user, next websites that the mobile user may access on the mobile device, next products that the mobile user may look at or purchase, and next physical locations that the mobile user may go to.

6. The method of claim 1, wherein said predicting is utilized by one or more of merchants, advertisers, government agencies, and law enforcements.

7. The method of claim 1, wherein said predicting is utilized to uniquely identify the mobile user as the mobile user moves in the site or in another site.

8. The method of claim 1, wherein said determining a plurality of different device identifications and said determining repetitive or false unique device identifications comprises a dwell-time filter based on a threshold value.

9. The method of claim 8, wherein said dwell-time filter includes one or more of a recency-time filter, an odd-behavior filter, an Organizationally Unique Identifier (OUI) filter, a locally administered device identification and a predetermined device identification pattern.

10. A system for identifying a mobile user in a site, the mobile user using a mobile device in communication with a wireless network in the site, the system comprising:
    a wireless access point for receiving data packets from the mobile device attempting to access the wireless network, the data packets including a plurality of different identifications for the mobile device; and
    a server in communication with the computer network for receiving, in real time and via the wireless network, a plurality of data packets from the wireless access point,
    determining a plurality of different device identifications for the mobile device used by the mobile user, from the received data packets,
    determining repetitive or false device identifications in the determined plurality of different device identifications,
    eliminating the repetitive or false device identifications in the determined plurality of different device identification to obtain an accurate device identification,
    using the accurate device identification to uniquely identify the mobile device associated with the accurate device identification, and
    predicting what the mobile user will do or where the mobile user will go within the site.

11. The system of claim 10, wherein the plurality of different device identifications are one or more of media access control (MAC) addresses, International Mobile Equipment Identity (IMEI) and Bluetooth Identifiers.

12. The system of claim 10, wherein the server further time stamps a first-seen and a last-seen device identification from the plurality of different device identifications.

13. The system of claim 10, further comprising a dwell-time filter for identifying the plurality of different device identifications and determining repetitive or false device identifications, based on a threshold value.

14. The system of claim 13, wherein said dwell-time filter includes one or more of a recency-time filter, an odd-behavior filter, an Organizationally Unique Identifier (OUI) filter, a locally administered device identification and a predetermined device identification pattern.

15. The system of claim 13, wherein said dwell-time filter dynamically changes based on system parameters or a number of false-positives in a given time period or per a given number of observations.

16. The system of claim 10, wherein said predicting information is utilized by one or more of merchants, advertisers, government agencies, and law enforcements to uniquely identify the mobile user as the mobile user moves in the site or in another site.

17. A non-transitory computer storage medium including a plurality of instructions, the instructions when executed by one or more processors performing a method for identifying a mobile user in a site, the site including a wireless access point, the method comprising:
    receiving, in real time and via a wireless network, a plurality of data packets from the wireless access point;
    determining a plurality of different device identifications for the mobile device used by the mobile user, from the received data packets;
    determining repetitive or false device identifications in the determined plurality of different device identifications;

eliminating the repetitive or false device identifications in the determined plurality of different device identification to obtain an accurate device identification;

using the accurate device identification to uniquely identify the mobile device associated with the accurate device identification; and predicting what the mobile user will do or where the mobile user will go within the site.

18. The non-transitory computer storage medium of claim 17, wherein the plurality of different device device identifications are one or more of media access control (MAC) addresses, International Mobile Equipment Identity (IMEI) and Bluetooth Identifiers.

19. The non-transitory computer storage medium of claim 17, wherein said predicting what the mobile user will do or where the mobile user will go includes one or more of future paths of the mobile user, next websites that the mobile user may access on their mobile devices, next products that the mobile user may look at or purchase, and next physical locations that the mobile user may access.

20. The non-transitory computer storage medium of claim 17, wherein said predicting information is utilized by one or more of merchants, advertisers, government agencies, and law enforcements to uniquely identify the mobile user as the mobile user moves in the site or in another site.

* * * * *